(12) United States Patent
Kwon et al.

(10) Patent No.: US 10,725,592 B2
(45) Date of Patent: Jul. 28, 2020

(54) INPUT APPARATUS OF TOUCH GESTURE AND CONTROL METHOD THEREOF

(71) Applicants: HYUNDAI MOTOR COMPANY, Seoul (KR); KIA MOTORS CORPORATION, Seoul (KR)

(72) Inventors: Gideok Kwon, Seoul (KR); Donghee Seok, Suwon-si (KR); Jong Bok Lee, Suwon-si (KR); HeeJin Ro, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 45 days.

(21) Appl. No.: 15/820,283

(22) Filed: Nov. 21, 2017

(65) Prior Publication Data

US 2018/0299986 A1    Oct. 18, 2018

(30) Foreign Application Priority Data

Apr. 12, 2017    (KR) .................. 10-2017-0047602

(51) Int. Cl.

| | | |
|---|---|---|
| *G06F 3/044* | (2006.01) | |
| *G06F 3/0354* | (2013.01) | |
| *G06F 3/041* | (2006.01) | |
| *B60K 35/00* | (2006.01) | |
| *G06F 3/0488* | (2013.01) | |
| *G06F 3/038* | (2013.01) | |

(52) U.S. Cl.
CPC ............. *G06F 3/044* (2013.01); *B60K 35/00* (2013.01); *G06F 3/038* (2013.01); *G06F 3/03547* (2013.01); *G06F 3/0416* (2013.01); *G06F 3/04883* (2013.01); *B60K 2370/1446* (2019.05); *G06F 2203/0339* (2013.01); *G06F 2203/04101* (2013.01)

(58) Field of Classification Search
CPC ................. G06F 3/044; G06F 3/03547; G06F 2203/0339; G06F 2203/04101; G06F 3/043; G06F 3/046; B60K 37/06

See application file for complete search history.

(56) References Cited

U.S. PATENT DOCUMENTS

| | | | | |
|---|---|---|---|---|
| 9,727,225 B2* | 8/2017 | Rhee | ..................... | G06F 3/0486 |
| 2002/0158838 A1* | 10/2002 | Smith | ................... | G06F 1/1616 |
| | | | | 345/156 |

(Continued)

*Primary Examiner* — Kent W Chang
*Assistant Examiner* — Sujit Shah
(74) *Attorney, Agent, or Firm* — Morgan, Lewis & Bockius LLP

(57) ABSTRACT

An input apparatus includes a first sensor device comprising a metal bar extending in a first direction and formed of a metallic material and a first sensor connected to the metal bar and configured to acquire information on a user's touch gesture with respect to the metal bar; a second sensor device comprising a plurality of second sensors disposed on one side of the metal bar along the first direction to be adjacent to the metal bar and configured to acquire touch or proximity information of a user with respect to the plurality of second sensors; and a controller configured to recognize the user's touch gesture based on sensor value information acquired by the second sensor device with the sensor value information of the first sensor device when the sensor value information is acquired by the first sensor device.

12 Claims, 9 Drawing Sheets

(56) References Cited

U.S. PATENT DOCUMENTS

| | | | |
|---|---|---|---|
| 2007/0103450 A1* | 5/2007 | Tang | G06F 3/03547 |
| | | | 345/173 |
| 2012/0026196 A1* | 2/2012 | Deng | G06F 3/033 |
| | | | 345/649 |
| 2015/0116254 A1* | 4/2015 | Solven | G06F 3/044 |
| | | | 345/174 |
| 2017/0010727 A1* | 1/2017 | Jeon | G06F 3/016 |
| 2017/0090652 A1* | 3/2017 | Sato | G06F 3/0416 |
| 2017/0234609 A1* | 8/2017 | Park | F25D 29/005 |
| | | | 345/174 |
| 2017/0277310 A1* | 9/2017 | Xiong | G06F 3/044 |

\* cited by examiner

SECOND DIRECTION ← → FIRST DIRECTION

INPUT APPARATUS OF TOUCH GESTURE AND CONTROL METHOD THEREOF

CROSS-REFERENCE TO RELATED APPLICATION(S)

This application is based on and claims the benefit of priority to Korean Patent Application No. 10-2017-0047602, filed on Apr. 12, 2017 in the Korean Intellectual Property Office, the disclosure of which is incorporated herein by reference.

TECHNICAL FIELD

The present disclosure relates to an input apparatus and a method of controlling the same, and more particularly, to an input apparatus formed in a bar shape and configured to receive a touch gesture input by a user and a method of controlling the same.

BACKGROUND

Vehicles include a cluster to display various information on driving functions of the vehicles such as a vehicle speed, an engine RPM, a fuel level, and a coolant temperature, etc.

The vehicles may provide a variety of functions such as an audio play, a video play, navigation, air conditioning and ventilation, seat control, lighting control, and the like in addition to basic driving functions.

Research has been recently conducted on various input apparatuses allowing a user to safely and simply manipulate these functions by easily calling the functions of vehicles.

SUMMARY

Therefore, an aspect of the present disclosure provides an input apparatus capable of implementing a capacitive touch gesture interface on a surface of a metal and a method of controlling the same.

Additional aspects of the disclosure will be set forth in part in the description which follows and, in part, will be obvious from the description, or may be learned by practice of the disclosure.

According to an aspect of the present disclosure, an input apparatus may include a first sensor device comprising a metal bar extending in a first direction and formed of a metallic material and a first sensor connected to the metal bar and configured to acquire information on a user's touch gesture with respect to the metal bar; a second sensor device comprising a plurality of second sensors disposed on one side of the metal bar along the first direction to be adjacent to the metal bar and configured to acquire touch or proximity information of a user with respect to the plurality of second sensors; and a controller configured to recognize the user's touch gesture based on sensor value information acquired by the second sensor device with the sensor value information of the first sensor device when the sensor value information is acquired by the first sensor device.

The input apparatus may further comprise a third sensor device comprising a plurality of third sensors disposed on another side of the metal bar along the first direction to be adjacent to the metal bar and configured to acquire touch or proximity information of a user with respect to the third sensors.

The controller may recognize the user's touch gesture based on sensor value information acquired by at least one of the second sensor device and the third sensor device with the sensor value information of the first sensor device upon receiving the sensor value information acquired by the first sensor device.

The plurality of second sensors may be arranged to be spaced apart from each other at predetermined intervals in the first direction.

The second sensor device may be disposed to be spaced apart from the metal bar by a predetermined distance in a second direction perpendicular to the first direction.

The input apparatus may further include a metal bar guide having a base portion having a plate shape and a protrusion protruding upwards from the base portion to allow the metal bar to be fitted onto the protrusion; and a nonconductive coating layer formed of a nonconductive material on a top surface of the base portion, wherein the second sensor device is disposed on the top surface of the nonconductive coating layer.

The input apparatus may further comprise a sensor cover disposed on the second sensor device to protect the second sensor device and the nonconductive coating layer from external impact.

The sensor cover may be formed of at least one material selected from wood, leather, and polycarbonate.

The metal bar guide may be formed of a nonconductive material.

The first sensor device may form a first sensing area around the metal bar, and the second sensor device forms a second sensing area around the plurality of second sensors.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
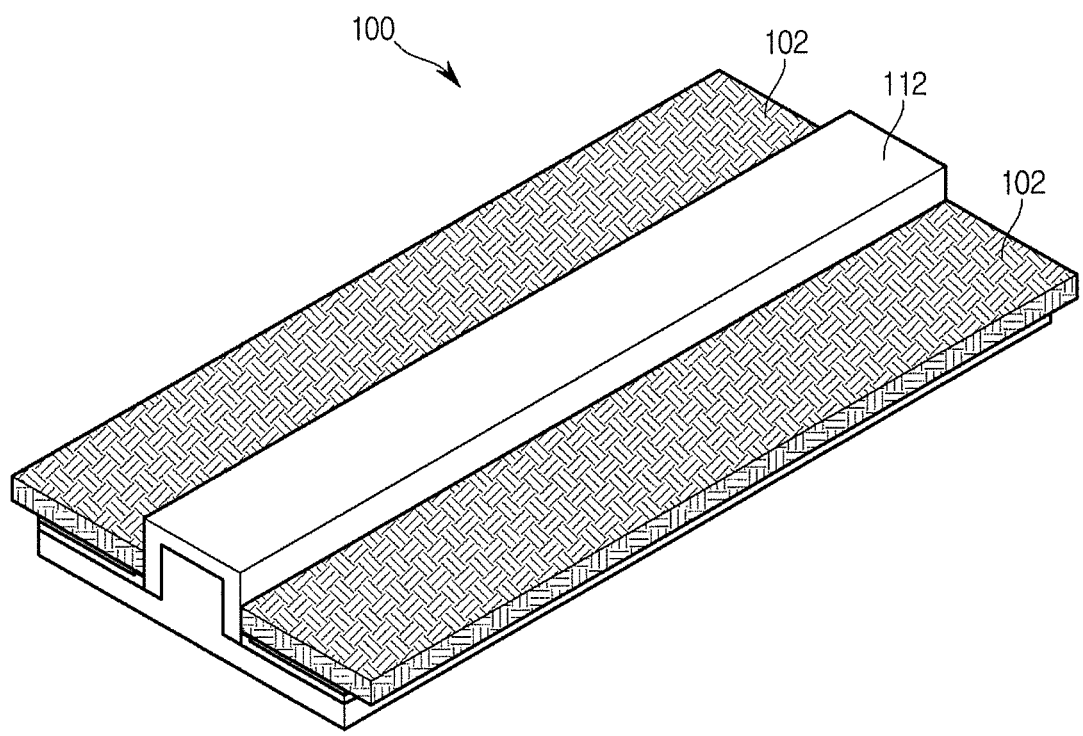
FIG. 1 is a perspective view illustrating an input apparatus according to an embodiment.

Reference will now be made in detail to the embodiments of the present disclosure, examples of which are illustrated in the accompanying drawings, wherein like reference numerals refer to like elements throughout.

Hereinafter, an input apparatus and a control method thereof according to an embodiment of the present disclosure will be described. The disclosed input apparatus and control method thereof may be applied to various fields. Hereinafter, an input apparatus applied to vehicles will be described by way of example for descriptive convenience.

FIG. 1 is a perspective view illustrating an input apparatus 100 according to an embodiment.

Referring to FIG. 1, the input apparatus 100 according to an embodiment includes a metal bar 112 and a sensor cover 102.

The metal bar 112 may extend in a first direction. The metal bar 112 may be formed of a metallic material.

The metal bar 112 may allow a user to touch or slide the same using a body part of the user such as a finger. The metal bar 112 may protrude upwards from the sensor cover 102. Since the metal bar 112 protrudes upwards from the sensor cover 102, the user may easily touch or slide the metal bar 112 even in a dark environment.

The metal bar 112 may protrude from an upper surface of the sensor cover 102 by about 0.6 mm. The thickness is determined in consideration of a sensing area of a sensor which will be described later (e.g., a second sensor) and may vary in accordance with design specification.

The sensor cover 102 may cover surrounding areas of the metal bar 112. The sensor cover 102 may be disposed in close contact with side surfaces of the metal bar 112 to prevent gaps that may be formed between the sensor cover 102 and the metal bar 112. Thus, entrance of foreign substances into the gaps between the sensor cover 102 and the metal bar 112 may be prevented.

A sensor may be disposed under the sensor cover 102. The sensor cover 102 may protect the sensor from an external impact.

The sensor cover 102 may be formed of various materials. For example, the sensor cover 102 may be formed of at least one material selected from wood, leather, and polycarbonate. The material used to form the sensor cover 102 may be selected in consideration of characteristics such as impact resistance. The material of the sensor cover 102 may also be selected in consideration of interior designs of the vehicle.

In the input apparatus 100 according to an embodiment, a protrusion of the metal bar 112 and the upper surface of the sensor cover 102 may only be exposed to the outside. Thus, sensors disposed under to the sensor cover 102 may be protected from external impact. In addition, attractiveness of the appearance of the input apparatus 100 may be improved.

Figure 2:
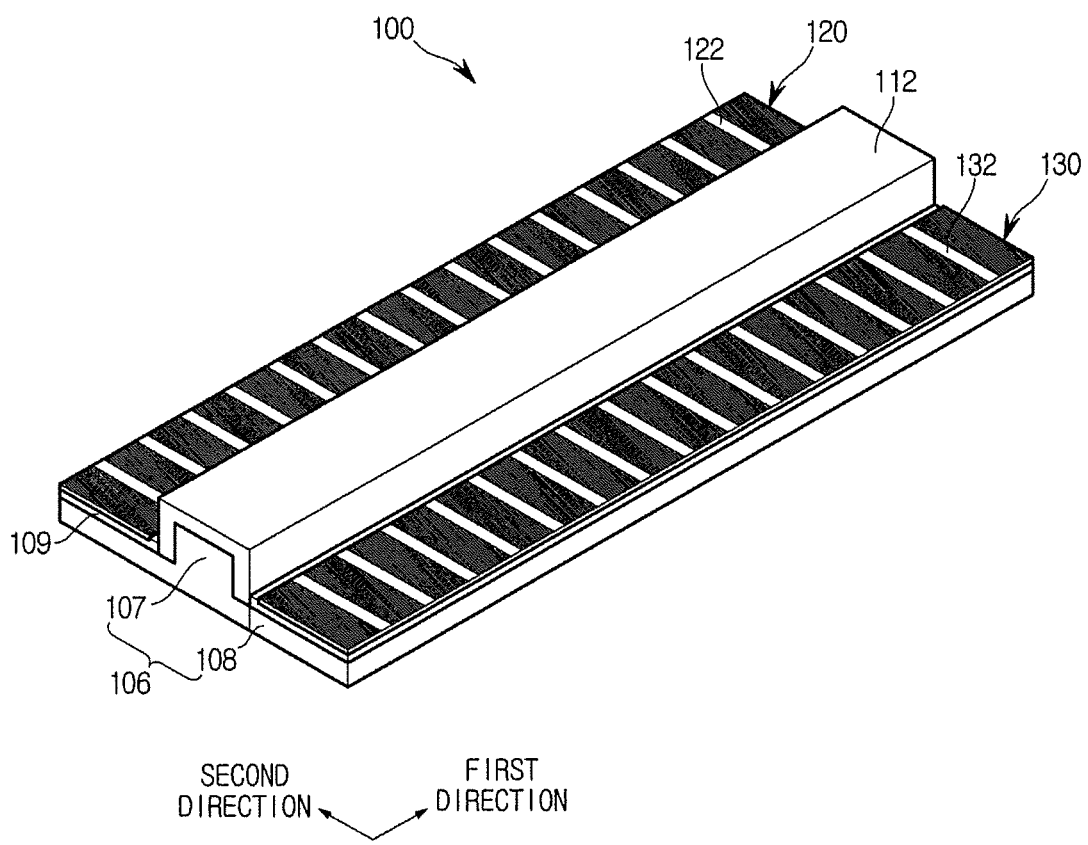
FIG. 2 is a perspective view illustrating the input apparatus according to an embodiment from which the sensor cover is omitted.
Figure 3:
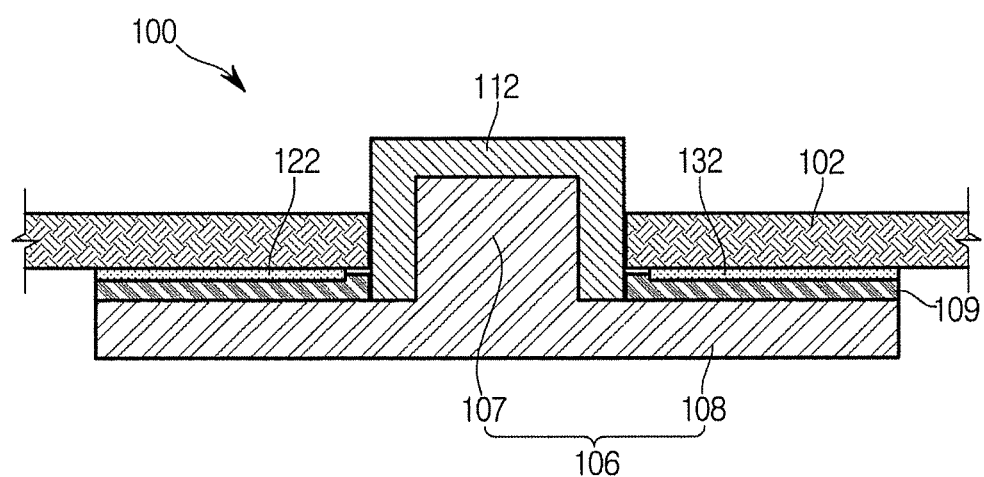
FIG. 3 is a cross-sectional view illustrating the input apparatus.

FIG. 2 is a perspective view illustrating the input apparatus 100 according to an embodiment from which the sensor cover 102 is omitted. FIG. 3 is a cross-sectional view illustrating the input apparatus 100.

As illustrated in FIGS. 2 and 3, the input apparatus 100 may include a first sensor device 110 (FIG. 4) including the metal bar 112, a second sensor device 120 including a plurality of second sensors 122, a third sensor device 130 including a plurality of third sensors 132, a nonconductive coating layer 109, and a metal bar guide 106. In addition, although not illustrated in the drawings, the first sensor device 110 of the input apparatus 100 may include a first sensor (not shown) connected to the metal bar 112 and configured to sense a touch of the user on the metal bar 112.

The metal bar guide 106 may be formed of a nonconductive material. If the metal bar guide 106 is formed of a metallic material like the metal bar 112, the weight and manufacturing cost thereof may increase. However, the present embodiment is not limited thereto, and the metal bar guide 106 may also be formed of a conductive material. In addition, the metal bar guide 106 may be integrated with the metal bar 112.

The metal bar guide 106 may include a protrusion 107 extending in the first direction and protruding upwards such that the metal bar 112 is fitted onto the metal bar guide 106. The metal bar guide 106 may have a base portion 108 extending in a second direction perpendicular to the first direction from both sides of the protrusion 107. In other words, the metal bar guide 106 may include a base portion 108 having a plate shape and the protrusion 107 protruding upwards from the base portion 108.

The metal bar 112 may be fitted onto the protrusion 107. The metal bar 112 may be connected to the first sensor (not shown). The first sensor (not shown) may sense whether or not the user touches the metal bar 112. Since the metal bar 112 is formed of a conductive material, for example, a metal, the first sensor (not shown) may sense any part of the metal bar 112 that is touched by the user.

The nonconductive coating layer 109 may be disposed on an upper surface of the base portion 108. The nonconductive coating layer 109 may be formed of a nonconductive material. The nonconductive coating layer 109 may cover the entire upper surface of the base portion 108. However, the present embodiment is not limited thereto and the nonconductive coating layer 109 may also cover a part of the upper surface of the base portion 108.

The second sensor device 120 may be disposed on the left side of the metal bar 112 and the third sensor device 130 may be disposed on the right side of the metal bar 112. The terms "second" and "third" are used for descriptive convenience and constituent elements are not limited by these terms.

The second sensor device 120 may include a plurality of second sensors 122 and the plurality of second sensors 122 may be arranged in the first direction to be spaced apart from each other with predetermined intervals. The plurality of second sensors may be disposed on an upper surface of the nonconductive coating layer 109 to be electrically separated from each other by the nonconductive coating layer 109. This structure may prevent the plurality of second sensors 122 from contacting each other so that they are not electrically connected to each other.

In addition, the plurality of second sensors 122 may be disposed adjacent to the metal bar 112. Specifically, the plurality of second sensors 122 may be spaced apart from the metal bar 112 at a predetermined distance in the second direction. Since the plurality of second sensors 122 is disposed adjacent to the metal bar 112, the distance between the metal bar 112 and the second sensors 122 may be very small. Thus, electrical connection between the metal bar 112 and the second sensors 122 caused by contact therebetween may be prevented.

The third sensor device 130 may include a plurality of third sensors 132 and the plurality of third sensors 132 may be arranged in the first direction to be spaced apart from each other with predetermined intervals. The plurality of third sensors 132 may be disposed on an upper surface of the nonconductive coating layer 109 to be electrically separated from each other by the nonconductive coating layer 109. This structure may prevent the plurality of third sensors 132 from contacting each other so that they are not electrically connected to each other.

In addition, the plurality of third sensors 132 may be disposed adjacent to the metal bar 112. Specifically, the plurality of third sensors 132 may be spaced apart from the metal bar 112 at a predetermined distance in the second direction. Since the plurality of third sensors 132 is disposed adjacent to the metal bar 112, the distance between the metal bar 112 and the third sensors 132 may be very small. Thus, electrical connection between the metal bar 112 and the third sensors 132 caused by contact therebetween may be prevented.

Although FIGS. 2 and 3 illustrate a case in which the plurality of second sensors 122 is connected to each other via one sensor channel to constitute the second sensor device 120 and the plurality of third sensors 132 is connected to each other via one sensor channel to constitute the third sensor device 130 by way of example, structures of the channels may be modified in various ways according to embodiments.

For example, the second sensors 122 of the second sensor device 120 and the third sensors 132 of the third sensor device 130 may have a structure in which the second sensors 122 and the third sensors 132 aligned in the second direction perpendicular to the first direction with respect to the metal bar 112 are connected with each other via one sensor channel.

The numbers of the second sensors 122 of the second sensor device 120 and the third sensors 132 of the third sensor device 130 may vary in accordance with the designer's intention. For example, each of the second sensor device 120 and the third sensor device 130 may include, e.g., 10 to 15 sensors. In addition, the number of the second sensors 122 may be the same as or different from that of the third sensors 132 according to embodiments. When the number of the second sensors 122 is the same as that of the third sensors 132, the second sensors 122 and the third sensors 132 may be disposed at symmetrical positions on both sides of the metal bar 112 or disposed in a zigzag form according to embodiments.

Since the second sensor device 120 and the third sensor device 130 are arranged symmetrically on both sides of the metal bar 112 with the metal bar 112 in the input apparatus 100 according to the present embodiment, a user's touch gesture or a user's drag touch gesture on the input apparatus 100 may be sensed. Detailed operation principles thereof will be described in more detail later in related sections.

The sensor cover 102 may be disposed on the second sensor device 120 and the third sensor device 130. As described above, the sensor cover 102 may protect the plurality of second sensors 122, the plurality of third sensors 132, and the nonconductive coating layer 109 disposed under the second and third sensor devices 120 and 130 from an external impact. In addition, the sensor cover 102 may be disposed in close contact with the metal bar 112 to prevent foreign substances from entering gaps between the sensor cover 102 and the metal bar 112. The sensor cover 102 may be disposed in close contact with the metal bar 112 to prevent components other than the metal bar 112 from being exposed to the outside.

Figure 4:
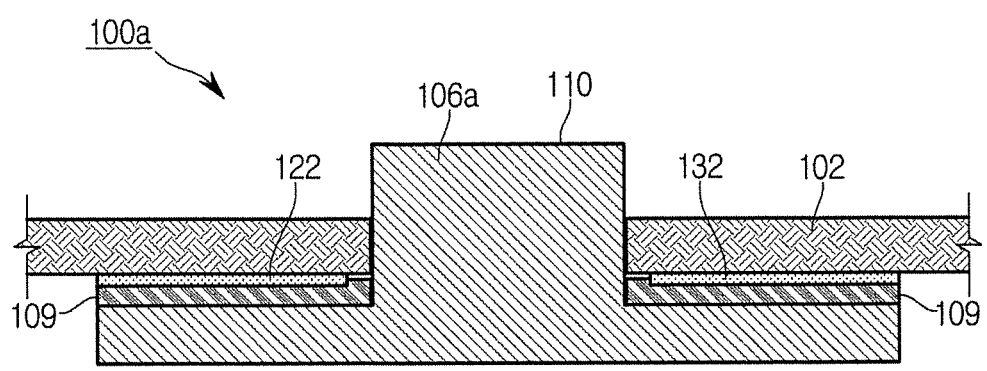
FIG. 4 is a cross-sectional view illustrating an input apparatus according to another embodiment of the present disclosure.

FIG. 4 is a cross-sectional view illustrating an input apparatus 100a according to another embodiment of the present disclosure.

In the input apparatus 100a illustrated in FIG. 4, a metal bar (112 of FIG. 3) may be integrated with a metal bar guide (106 of FIG. 3) in a manner different from that illustrated in FIGS. 2 and 3 and an integrated structure of the metal bar and the metal bar guide may be referred to as a metal support 106a.

The metal support 106a may be formed of a conductive material such as a metal. Although the metal support 106a is formed of a metallic material, the metal support 106a may not be electrically connected to the second sensors 122 and the third sensors 132 since the input apparatus 100a includes the nonconductive coating layer 109 and the second sensors 122 and the third sensors 132 are disposed to be spaced apart from the metal support 106a by a predetermined distance.

Figure 5:
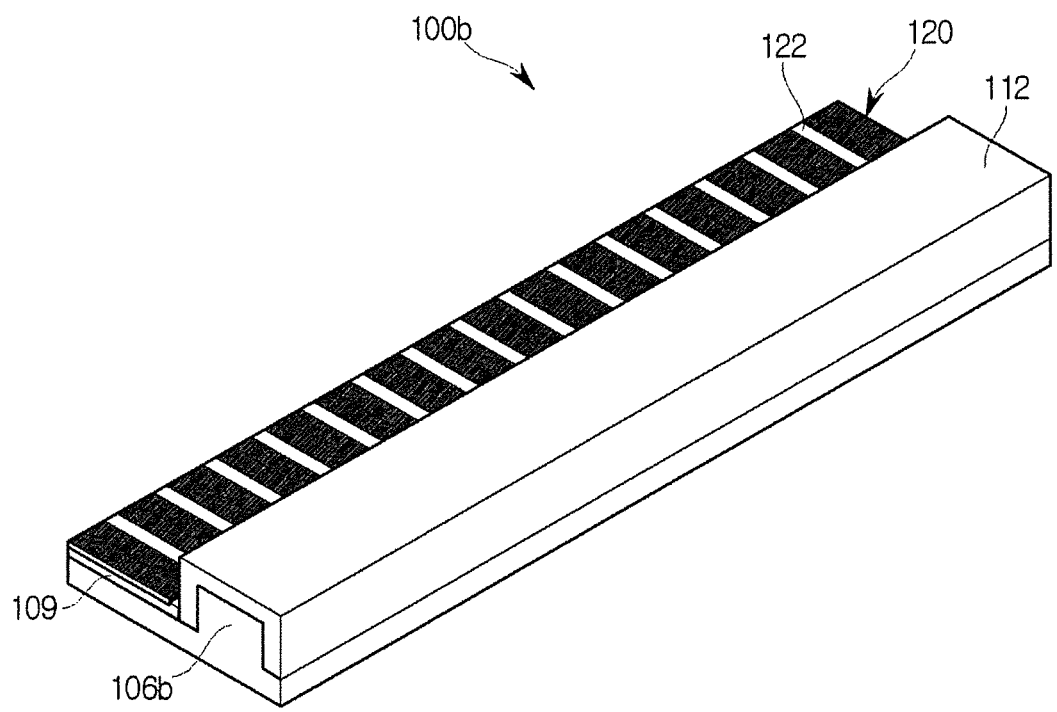
FIG. 5 is a perspective view illustrating an input apparatus 100b according to another embodiment.

FIG. 5 is a perspective view illustrating an input apparatus 100b according to another embodiment.

Referring to FIG. 5, the input apparatus 100b may include a first sensor device 110 (FIG. 4) including a metal bar 112, a second sensor device 120 including a plurality of second sensors 122, a nonconductive coating layer 109, and a metal bar guide 106. In other words, the input apparatus 100b according to the present embodiment may include only the first sensor device 110 (FIG. 4) and the second sensor device 120 in a manner different from the input apparatus 100 illustrated in FIGS. 2 and 3. Hereinafter, descriptions given above will not be repeated.

The structure of the input apparatus 100 has been described. Hereinafter, the operational principle of the input apparatus 100 will be described in detail with reference to the above-mentioned structure of the input apparatus 100.

First, a method of inputting a user's touch gesture to the input apparatus 100 will be described, and then the operational principle of the input apparatus 100 will be described.

Figure 6:
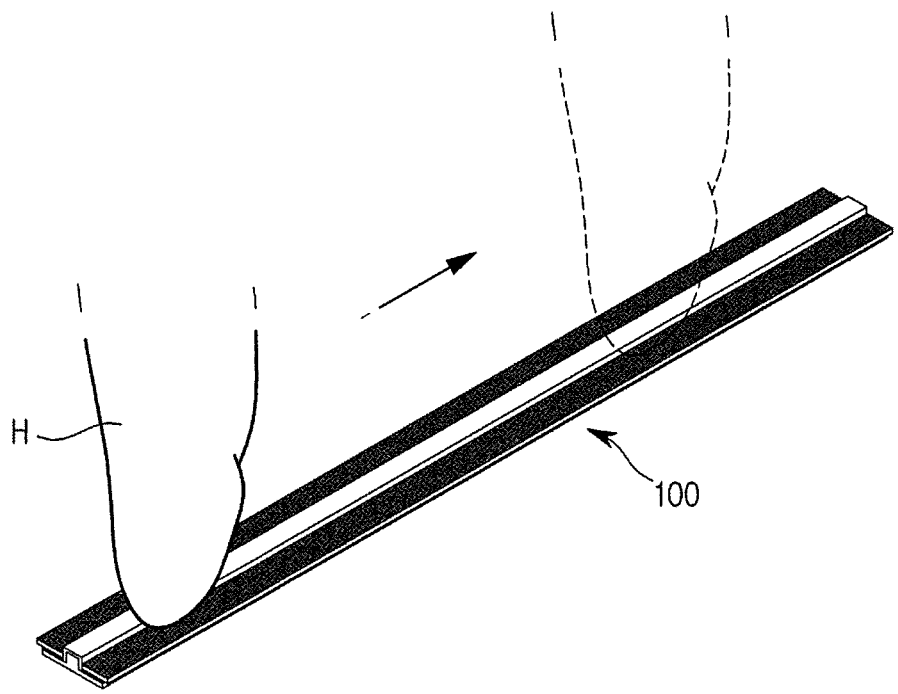
FIG. 6 is a view illustrating a method of inputting a user's touch gesture with respect to the input apparatus according to an embodiment.
Figure 7:
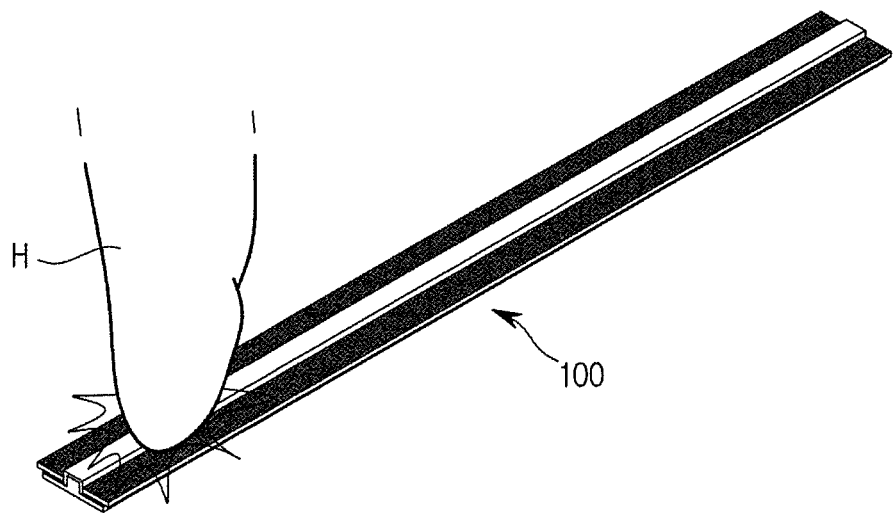
FIG. 7 is a view illustrating a method of inputting a user's drag touch gesture with respect to the input apparatus according to an embodiment.

FIG. 6 is a view illustrating a method of inputting a user's touch gesture with respect to the input apparatus 100 according to an embodiment. FIG. 7 is a view illustrating a method of inputting a user's drag touch gesture with respect to the input apparatus 100 according to an embodiment.

Hereinafter, the user's touch gesture refers to a user's gesture of contacting the input apparatus 100 with a body part of the user to make an input, e.g., a user's gesture of contacting the input apparatus 100 with a finger of the user.

In addition, the user's drag touch gesture refers to a user's gesture of sliding a body part of the user in a state of contacting the input apparatus 100 in one direction, e.g., a user's gesture of sliding a finger of the user in a state of contacting the metal bar 112 of the input apparatus 100.

Referring to FIG. 6, the user's touch gesture may be input via a user's finger H. The user may input a touch gesture to the metal bar 112 of the input apparatus 100 with any one of five fingers.

In general, a user's finger H has an average diameter of 8 to 10 mm. Thus, when the user touches the metal bar 112 with a finger H, a remaining area of the finger H excluding the thickness of the metal bar 112 may be exposed to a sensing area of at least one of the second sensor device 120 and the third sensor device 130.

For example, when the user touches the metal bar 112 with a finger H, an area of the user's finger H touching the metal bar 112 is greater than that of a width of the metal bar 112, and thus the area of the user's finger H is inevitably exposed to at least one of the second sensor device 120 and the third sensor device 130. The user's finger H may be exposed to both the second sensor device 120 and the third sensor device 130 as well as to the metal bar 112 or to at least one of the second sensor device 120 and the third sensor device 130 according to embodiments.

Then, referring to FIG. 7, the user's drag touch gesture may be input via a user's finger H. The user may input a drag touch gesture sliding on the metal bar 112 of the input apparatus 100 with any one of five fingers.

When the user's drag touch gesture is input, the remaining area of the finger H excluding the thickness portion of the metal bar 112 may be exposed to a sensing area of at least one of the second sensor device 120 and the third sensor device 130 in the same manner as in the case of inputting the user's touch gesture. Hereinafter, descriptions given above with regard to inputting of the touch gesture will not be repeated.

The input apparatus 100 according to the present embodiment may recognize the user's touch gesture based on sensor value information acquired by the first to third sensor devices 110, 120, and 130 which will be described later. Hereinafter, the operational principle of the input apparatus 100 according to the present disclosure will be described in detail.

Figure 8:
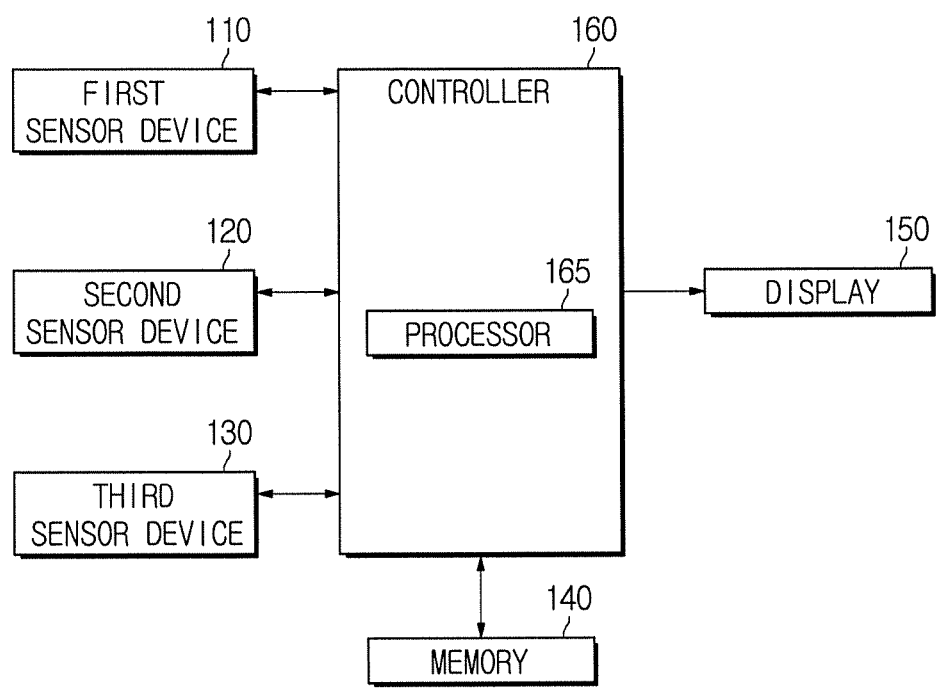
FIG. 8 is a control block diagram of the input apparatus according to an embodiment.
Figure 9:
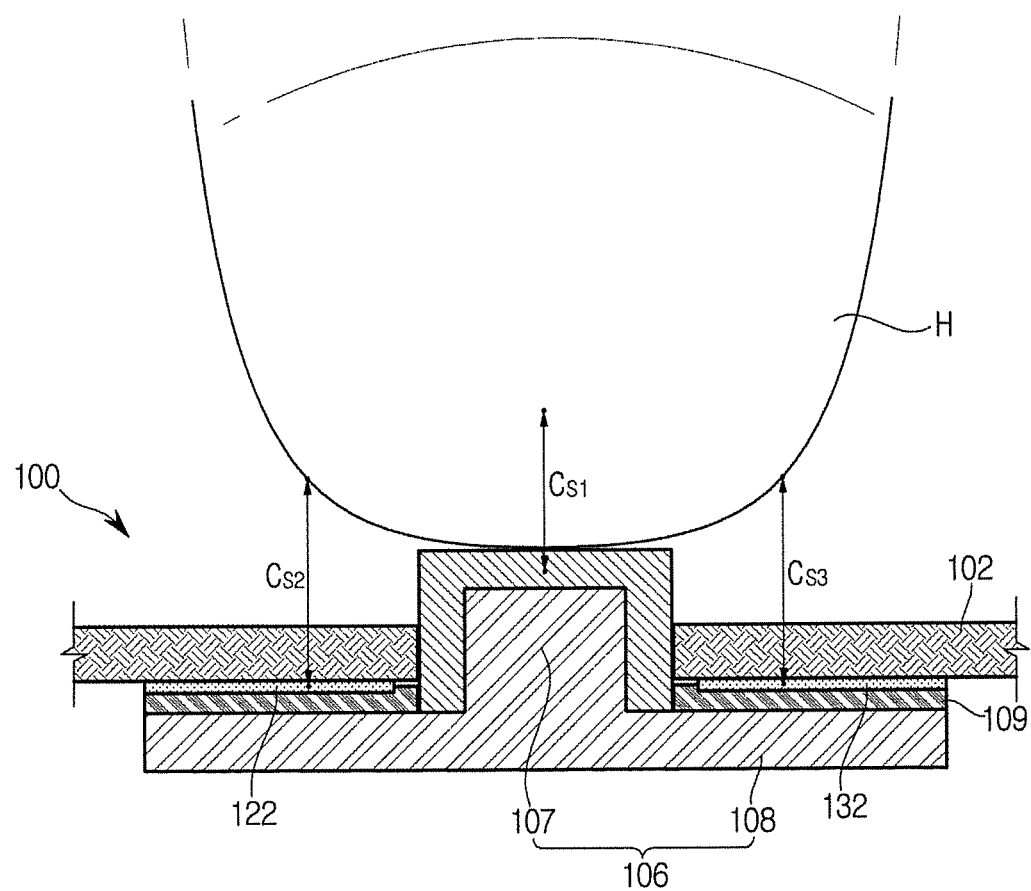
FIG. 9 is a view illustrating the operational principle of the input apparatus.

FIG. 8 is a control block diagram of the input apparatus 100 according to an embodiment. FIG. 9 is a view illustrating the operational principle of the input apparatus 100.

Referring to FIG. 8, the input apparatus 100 according to an embodiment includes the first sensor device 110, the second sensor device 120, the third sensor device 130, a memory 140, a display 150, and a controller 160.

The first to third sensor devices 110, 120, and 130 may be provided to acquire information on a user's touch gesture.

The first sensor device 110 may include the metal bar 112 and the first sensor and the metal bar 112 and the first sensor may be electrically connected to each other. The first sensor device 110 may operate in a touch mode and acquire information on the user's touch gesture. As illustrated in FIG. 9, when the user's touch gesture is input to the metal bar 112, a relatively high capacitance value Cs1 is obtained between the metal bar 112 and the user's finger. The first sensor may sense the capacitance value obtained when the user's touch gesture is input to the metal bar 112 and transmit the sensed value to the controller 160.

The second sensor device 120 and the third sensor device 130 may be disposed at both sides of the metal bar 112 of the first sensor device 110.

The second sensor device 120 may include a plurality of second sensors 122 arranged in the first direction to be adjacent to the metal bar 112. Descriptions given above with regard to the arrangement of the second sensors 122 will not be repeated.

The second sensors 122 of the second sensor device 120 may operate in a touch mode or a hovering mode. When a thickness of the sensor cover 102 protecting the second sensor device 120 is small, the second sensors 122 may operate in the touch mode. When the thickness of the sensor cover 102 protecting the second sensor device 120 is great, the second sensors 122 may operate in the hovering mode.

Since the input apparatus 100 according to the present disclosure includes the second sensor device 120 including sensors operating in a hovering mode, the user's touch gesture may be recognized even when the user's finger directly touches the second sensors 122.

For example, when the user's finger is positioned on a sensing area of the second sensor device 120, the second sensor device 120 may acquire information on a capacitance value Cs2 obtained between the user's finger and the second sensor device 120, and information on a capacitance value Cs3 obtained between the user's finger and the third sensor device 130 may be acquired by the third sensor device 130.

The third sensor device 130 may include the third sensors 132 arranged in the first direction to be adjacent to the metal bar 112. Descriptions given above with regard to the arrangement of the third sensors 132 will not be repeated.

The third sensors 132 of the third sensor device 130 may operate in a touch mode or a hovering mode. Hereinafter, descriptions given above with regard to the second sensor device 120 will not be repeated.

The first to third sensor devices 110, 120, and 130 may transmit sensor value information respectively acquired to the controller 160 and the information may be provided to a touch gesture recognition process of the controller 160.

The memory 140 may store various data, programs, or applications used to control the input apparatus 100 under the control of the controller 160. More particularly, the memory 140 may store control programs to control the input apparatus 100, dedicated applications initially provided by a manufacturer, general-purpose applications downloaded externally, objects to provide applications (e.g., image, text, icon, and button), and database.

The memory 140 may also serve to temporarily store sensor value information acquired by the first to third sensor devices 110, 120, and 130. In addition, the memory 140 may also store data required to recognize a user's gesture based on sensor value information acquired by the first to third sensor devices 110, 120, and 130, for example, information on position values of the plurality of second sensors 122 and the plurality of third sensors 132, and sensor value information output in case of inputting the user's touch gesture.

The memory 140 may include at least one storage medium selected from a flash memory, hard disc, memory card, Read-Only Memory (ROM), Random Access Memory (RAM), Electrically Erasable Programmable Read-Only Memory (EEPROM), Programmable Read-Only Memory (PROM), magnetic memory, magnetic disk, and optical disk.

The controller 160 controls the overall operation of the input apparatus 100 and a signal flow between internal components and processes data. The controller 160 may execute operating systems (OS) and various applications stored in the memory 140 upon a user's input or when predetermined conditions are satisfied.

The controller 160 may include a processor 165, a ROM (not shown) storing software programs which, when executed by the processor 165, controls the input apparatus 100, a RAM (not shown) storing sensor values or data received from the sensor devices of the input apparatus 100 or used as a storage corresponding to various operations performed by the input apparatus 100, and the like. The ROM and the RAM of the processor may be interconnected via an internal bus.

The controller 160 may recognize the user's touch gesture or the user's drag touch gesture based on the sensor value information acquired by the first to third sensor devices 110, 120, and 130.

The controller 160 may recognize the surface of the metal bar 112 and a touch gesture of the finger based on sensor value information acquired by the first sensor device 110 and recognize a gesture of the user's finger performed around the second and third sensor devices 120 and 130 based on sensor value information acquired by the second and third sensor devices 120 and 130.

First, a method of recognizing a user's touch gesture by the controller 160 is as follows.

Upon determination that a user's touch gesture is input based on the sensor value information acquired by the first sensor device 110, the controller 160 may recognize a positon where the user's touch gesture is input based on the sensor value information acquired by at least one of the second sensor device 120 and the third sensor device 130 with the sensor value information of the first sensor device 110.

The controller 160 may extract input time of the user's touch gesture based on the sensor value information acquired by the first sensor device 110 and sense a touch length of the touch gesture based thereon. The controller 160 may determine to perform different control commands based on the touch length of the touch gesture.

Next, a method of recognizing a user's drag touch gesture by the controller 160 will be described.

Upon determination that a user's touch gesture is input based on the sensor value information acquired by the first sensor device 110, the controller 160 may recognize a position where the user's touch gesture is input based on the sensor value information acquired by at least one of the second sensor device 120 and the third sensor device 130 with the sensor value information of the first sensor device 110.

Then, the controller 160 may group the second and third sensors 122 and 132 of the second and third sensor devices 120 and 130 into a plurality of sensor groups to recognize the user's drag touch gesture by steps.

Hereinafter, a method of grouping sensors when each of the second sensor device 120 and the third sensor device 130 includes 12 sensors will be described by way of example.

For example, in order to implement a 12-step drag touch gesture procedure by the input apparatus 100 according to the present disclosure, the controller 160 may determine that each group includes one sensor. According to an embodiment, in order to implement a 6-step drag touch gesture procedure by the input apparatus 100 according to the present disclosure, the controller 160 may determine that each group includes two sensors. However, examples of the grouping performed by the controller 160 are not limited thereto and the grouping method performing by the controller 160 may be determined in accordance with sensitivity to the user's drag tough to be realized.

As described above, the controller 160 may generate a final signal value of the touch gesture upon receiving the sensor value information from the second and third sensor devices 120 and 130 under the premise that the sensor value information is generated by the first sensor device 110. On the contrary, if the first sensor device 110 does not generate sensor value information, the controller 160 may not generate the final signal value of the touch gesture regardless of the sensor values acquired by the second and third sensor devices 120 and 130.

The display 150 may provide visual feedback corresponding to a control command input to the input apparatus 100. When the user's touch gesture is input to the input apparatus 100, the display 150 may provide an execution screen of a function corresponding to the input command. According to an embodiment, when the user's drag touch gesture is input to the input apparatus 100, the display 150 may provide an execution screen of a function corresponding to the input command. Thus, the input apparatus according to the present disclosure may provide the user with an experience of an intuitive touch interface.

The operational principle of the input apparatus 100 according to the present disclosure has been described above. Next, a method of controlling the input apparatus 100 according to the present disclosure will be described.

The method of controlling the input apparatus 100 according to the present disclosure is based on the structure of the input apparatus 100 illustrated FIGS. 1 to 3 described above.

The method of controlling the input apparatus 100 includes receiving sensor value information acquired by the first sensor device 110 and recognizing a user's touch gesture based on sensor value information acquired by at least one of the second sensor device 120 and the third sensor device 130 with the sensor value information of the first sensor device 110.

The controller 160 may recognize the surface of the metal bar 112 and a touch of a finger based on sensor value information acquired by the first sensor device 110 and recognize a gesture of the user's finger performed around the second sensor device 120 and the third sensor device 130 based on sensor value information acquired by the second sensor device 120 and the third sensor device 130.

Since detailed descriptions of the method of controlling the input apparatus 100 are the same as those of the operational principle of the input apparatus 100, descriptions given above will not be repeated.

As is apparent from the above description, according to the input apparatus and the control method thereof according to the present disclosure, the following effects may be obtained.

First, accuracy of the input apparatus may be improved by using a plurality of capacitive sensors.

Also, a capacitive touch gesture interface may be implemented on a surface of a metal thereby providing an intuitive touch interface experience to the user.

In addition, difficulty in attaching a piezofilm to a surface of a metal and an increase in manufacturing costs by reducing a thickness of the metal caused in a method of recognizing a pressure or the like applied to the surface of the metal by attaching the piezofilm to a rear surface of the metal may be solved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An input apparatus comprising: a first sensor device comprising a metal bar extending in a first direction and including a metallic material and a first sensor connected to the metal bar and configured to acquire information on a user's touch gesture via the metal bar when the user touches the metal bar; a second sensor device comprising a plurality of second sensors disposed on one side of the metal bar along the first direction to be adjacent to the metal bar, the second sensor device configured to acquire touch or proximity information of a user via the plurality of second sensors; and a controller configured to recognize the user's touch gesture based on first sensor value information acquired by the first sensor device and second sensor value information acquired by the second sensor device when the first sensor value information is acquired by the first sensor device, wherein the first and second sensor devices are arranged and configured such that the first and second sensor value information are simultaneously acquired by the first and second sensor devices, respectively, and wherein the first and second sensor devices extend along the first direction in parallel relative to each other, and wherein the first and second sensor devices are disposed at different height levels from each other in a thickness direction of the input apparatus.

2. The input apparatus according to claim 1, further comprising a third sensor device comprising a plurality of third sensors disposed on another side of the metal bar along the first direction to be adjacent to the metal bar and configured to acquire touch or proximity information of the user with respect to the plurality of third sensors.

3. The input apparatus according to claim 2, wherein the controller recognizes the user's touch gesture based on sensor value information acquired by at least one of the second sensor device or the third sensor device with the first sensor value information acquired by the first sensor device upon receiving the first sensor value information acquired by the first sensor device.

4. The input apparatus according to claim 1, wherein the plurality of second sensors are arranged to be spaced apart from each other at predetermined intervals in the first direction.

5. The input apparatus according to claim 1, wherein the second sensor device is disposed to be spaced apart from the metal bar by a predetermined distance in a second direction perpendicular to the first direction.

6. The input apparatus according to claim 1, further comprising:
 a metal bar guide having a base portion having a plate shape and a protrusion protruding upwards from the base portion to allow the metal bar to be fitted onto the protrusion; and
 a nonconductive coating layer formed of a nonconductive material on a top surface of the base portion,
 wherein the second sensor device is disposed on the top surface of the nonconductive coating layer.

7. The input apparatus according to claim 6, further comprising a sensor cover disposed on the second sensor device to protect the second sensor device and the nonconductive coating layer from external impact.

8. The input apparatus according to claim 7, wherein the sensor cover is formed of at least one material selected from wood, leather, and polycarbonate.

9. The input apparatus according to claim 6, wherein the metal bar guide is formed of a nonconductive material.

10. The input apparatus according to claim 1, wherein the first sensor device forms a first sensing area around the metal bar, and
 the second sensor device forms a second sensing area around the plurality of second sensors.

11. A method of controlling an input apparatus comprising: a first sensor device comprising a metal bar extending in a first direction and including a metallic material and a first sensor connected to the metal bar and configured to acquire information on a user's touch gesture via the metal bar; and a second sensor device comprising a plurality of second sensors disposed on one side of the metal bar along the first direction to be adjacent to the metal bar and configured to acquire touch or proximity information of a user via the plurality of second sensors, the method comprising: receiving first sensor value information acquired by the first sensor device when the user touches the metal bar; and recognizing a user's touch gesture based on second sensor value information acquired by the second sensor device and the first sensor value information acquired by the first sensor device, wherein the first and second sensor devices are arranged and configured such that the first and second sensor value information are simultaneously acquired by the first and second sensor devices, respectively, and wherein the first and second sensor devices extend along the first direction in parallel relative to each other, and wherein the first and second sensor devices are disposed at different height levels from each other in a thickness direction of the input apparatus.

12. The method according to claim 11, wherein the input apparatus further comprises a third sensor device comprising a plurality of third sensors disposed on another side of the metal bar along the first direction to be adjacent to the metal bar and configured to acquire touch or proximity information of a user via the plurality of third sensors, and
 the method further comprises recognizing the user's touch gesture based on sensor value information acquired by at least one of the second sensor device or the third sensor device with the first sensor value information acquired by the first sensor device upon receiving the first sensor value information acquired by the first sensor device.

* * * * *